(No Model.)

H. W. LIBBEY.
SLED PROPELLER.

No. 600,851.  Patented Mar. 15, 1898.

Witnesses.
Winfred G. Kerwin.
Edward C. Brown.

Inventor.
Hosea W. Libbey
by Edwin Planta
Attorney.

UNITED STATES PATENT OFFICE.

HOSEA W. LIBBEY, OF BOSTON, MASSACHUSETTS.

SLED-PROPELLER.

SPECIFICATION forming part of Letters Patent No. 600,851, dated March 15, 1898.

Application filed December 14, 1896. Serial No. 615,623. (No model.)

*To all whom it may concern:*

Be it known that I, HOSEA W. LIBBEY, a citizen of the United States, and a resident of Boston, in the county of Suffolk and State of Massachusetts, have invented certain new and useful Improvements in Bicycle-Sleds, of which the following, taken in connection with the accompanying drawings, is a specification.

My invention relates to certain improvements in sleds, the object being to produce a bicycle-sled so that the rider can propel himself along level roads or up hills, thus rendering the sled available for travel without the use of horses; and the invention consists of a platform mounted upon runners, the rear end being provided with a seat and rudder and the central portion with wheels and crank-shaft for propelling same, as hereinafter described, and pointed out in the claims.

Figure 1:
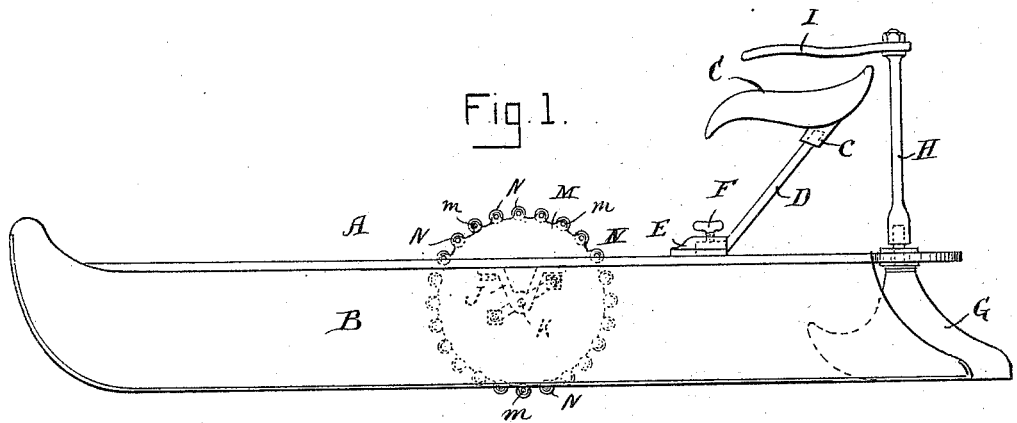
Figure 2:
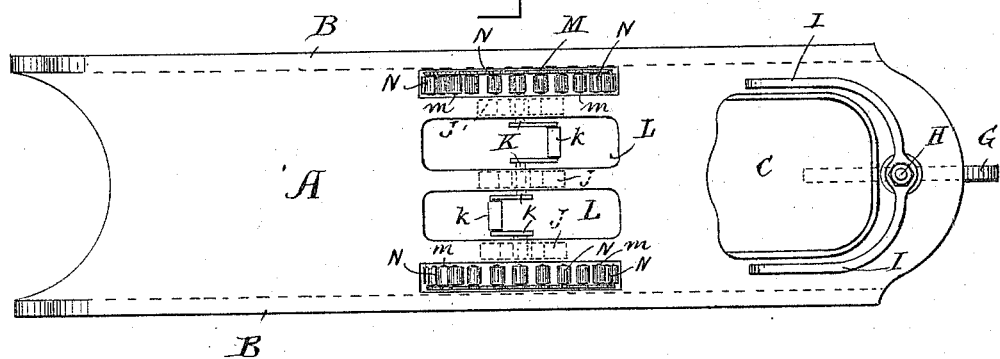
Figure 3:
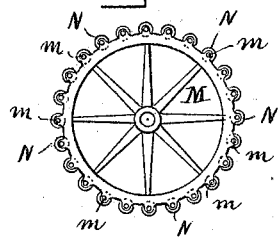
Figure 4:
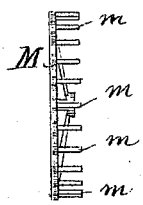

Referring to the accompanying drawings, Figure 1 represents a side view of a bicycle-sled embodying my invention. Fig. 2 is a plan or top view of same. Fig. 3 is a side view of one of the propelling-wheels, and Fig. 4 is an end view of same before the rollers are put on.

A represents a platform mounted upon runners B. Near the rear end of the platform is a seat C, which in the drawings I have shown supported by a bar D, the upper end of which fits into a socket $c$ on the under side of the seat, and its lower end is bent to fit into a socket E, secured to the top of the platform A, and is there secured by a set-screw F. Although I prefer this method of supporting the seat, it might be supported in any other convenient manner.

G is a rudder mounted at the rear end of the platform A and has a square shank that projects a few inches above said platform. Upon this shank is fitted a rod H, having at its upper end a tiller or a pair of arms I, as shown, by means of which the rudder G can be operated to guide the sled as desired.

Near the central portion of the platform on its under side are secured bearings J, in which is mounted a crank-shaft K, fitted with treadles $k$, long holes or slots L being formed in the platform for the feet of the rider to pass through to operate same. On each of the extreme ends of the crank-shaft K is mounted a wheel M, the perimeter of which is provided with a number of pins, studs, or axes $m$, upon which are mounted metal-lined rubber rollers N. The location of the shaft K and the diameter of the wheel M is such that the rollers N will be on a level with or project for a short distance below the level of the runners B, as shown.

The operation is as follows: Supposing the sled to be upon a level surface of snow, the rider mounts the sled and sits in the seat C. He then places his feet upon the treadles $k$ and his arms upon the arms I. When he wishes to start, he operates the treadles $k$, which causes the shaft K to rotate and with it the wheels M, so that the small rollers N will come in contact with the snow or ice and cause the sled to advance, and as said rollers N are free to rotate upon their axes the friction is reduced to a minimum and the speed of the sled is not impaired. Should the road be on a downward incline, the rider may, if he desires, remove his feet from the treadles and coast down the hill, he having at all times the sled under control by means of the rudder G.

Thus it will be seen that by means of a sled constructed as described the rider can coast down hill, travel on level roads, or ascend hills, as may be required.

Although I have shown the driving-wheels extending above the platform, they might, if desired, be of smaller diameter, so as to come below the platform.

What I claim is—

1. A sled consisting of a platform mounted upon runners, a seat adjustably secured to the platform, two driving-wheels mounted upon the ends of a central crank-shaft and a rudder operated from arms on each side of the seat substantially as set forth.

2. In combination with a sled driving-wheels mounted upon a cranked axle and having at the perimeter a number of pins, studs or axes upon which are mounted rubber rollers substantially as set forth.

In testimony whereof I have signed my name to this specification, in the presence of two subscribing witnesses, on this 30th day of November, A. D. 1896.

HOSEA W. LIBBEY.

Witnesses:
CHAS. STEERE,
EDWIN PLANTA.